3,030,356
MIXED ESTERS OF LACTOSE

George P. Touey and Herman E. Davis, Kingsport, Tenn., assignors to Eastman Kodak Company, Rochester, N.Y., a corporation of New Jersey
No Drawing. Filed Feb. 1, 1960, Ser. No. 5,596
3 Claims. (Cl. 260—234)

This application is a continuation in part of our application Serial No. 731,890, filed April 30, 1958, now Patent No. 2,931,802.

This invention relates to organic solvent soluble short chain aliphatic acid esters of lactose and their method of preparation. In particular it relates to completely esterified or highly esterified mixed aliphatic esters of lactose containing a combination of acetyl and propionyl or acetyl (or propionyl) and isobutyryl groups as acyl substituents.

One object of our invention is to provide as new chemical compounds substantially completely esterified, odorless, noncrystalline lactose acetate isobutyrates or acetate propionates. Another object of our invention is to provide as new chemical compounds substantially completely esterified lactose propionate isobutyrates which are noncrystallizing. A further object of our invention is to provide substantially completely esterified organic solvent soluble lactose esters which due to their noncrystalline state, lack of odor and excellent heat and hydrolysis stability are ideally suited as plasticizers or extenders in cellulose ester compositions. A still further object of our invention is to provide a practical procedure for producing these noncrystallizing lactose esters. Other objects of our invention will appear herein.

We have found that if a lactose mixed ester is prepared containing at least 20% isobutyryl or propionyl based on the total acyl content, the remainder being acetyl or propionyl, those esters when incorporated in cellulose ester compositions do not crystallize or otherwise interfere with the clarity of the products produced, do not develop odor at high humidities and are resistant to heat and hydrolysis.

The esters in accordance with our invention are prepared by heating lactose at 90–150° C. with a mixture of (1) isobutyric anhydride and acetic or propionic anhydride or (2) acetic anhydride and propionic anhydride in the presence of a salt of a weak organic acid until the product has been dissolved. Any unreacted anhydride and acid by-product is removed by distillation under reduced pressure. To remove traces of acid and salt catalyst, the residue is dissolved in a water-immiscible inert solvent and the resulting solution is washed with dilute NaOH or Na$_2$CO$_3$, following which the aqueous layer is removed and the inert solvent is distilled off under reduced pressure. Ordinarily, 2–4 hours gives sufficient time to run the reaction to completion although longer times may be employed. If desired, an inert diluent may be employed in the esterification media such as a ketone like diethyl ketone, a hydrocarbon such as toluene, or a chlorinated hydrocarbon such as propylene chloride. Acid diluents are not suitable since they may react with the anhydrides used, thereby altering the anhydride ratio employed.

To obtain noncrystallizing esters in accordance with our invention the proportions of the combinations acetic anhydride-propionic anhydride, acetic anhydride-isobutyric anhydride, or propionic anhydride-isobutyric anhydride must be controlled within definite limits. The total molar quantity of anhydride per mole of lactose must not be less than 8 nor more than 12. The acetic anhydride (or propionic anhydride when it is the minor acyl substituent) should not be above 4 or below 1 mole per mole of lactose being esterified. The most desirable ratio of reactants are within the range of 1–3 moles of acetic anhydride and 7–9 moles of isobutyric anhydride or propionic anhydride per mole of lactose. By this procedure there is obtained (when isobutyric anhydride is used), a substantially completely esterified lactose acetate isobutyrate with an acetyl content between 5 and 25% and an isobutyryl content between 31.7 and 59%. When the amounts of the lower anhydrides are significantly higher or lower than the limits specified, the products have a pronounced tendency to crystallize. Also, higher amounts of acetyl than those specified give products which are less resistant to hydrolysis.

The catalyst concentration may range from 1 to 20% based on the weight of lactose. Ordinarily, a concentration of 8% catalyst is sufficient. The catalyst may be a sodium, potassium, lithium, or calcium salt of a weak organic acid. The preferred catalyst is a salt whose anion corresponds to one of these anhydrides being used. For instance, in making lactose acetate isobutyrate the preferred catalyst is sodium isobutyrate or a mixture of sodium acetate and sodium isobutyrate. It is more convenient to form the catalyst in situ by adding sodium hydroxide to the mixture of the two anhydrides in forming the esterification mass. The following examples illustrate our invention.

(1) *Preparation of lactose acetate isobutyrate.*—One mole (342 g.) of lactose and 0.69 mole (27.6 g.) of sodium hydroxide were slurried in a mixture of 8 moles (1264 g.) of isobutyric anhydride and 2 moles (204 g.) of acetic anhydride. The rapidly stirred slurry was heated to 130° C. and maintained at this temperature for 4 hours. The resulting amber colored solution was concentrated by removing the acids and excess anhydride under reduced pressure (2–5 mm. Hg) at 95–100° C. The viscous residue was dissolved in n-heptane and the solution was thoroughly washed with an aqueous sodium hydroxide solution. This was followed by several water washes. The n-heptane was removed by distillation to yield 775 g. of a clear, pale yellow, extremely viscous liquid. This liquid solidified within a few minutes to form a hard amorphous solid. The ester had an average of 3.5 acetyl groups and 4.5 isobutyryl groups per lactose molecule. It was stable to heat (190° C.) and hydrolysis.

This procedure was repeated varying the amounts of acetic and isobutyric anhydride in the esterifying mixture to obtain esters with varying degrees of acetyl and isobutyryl substitution. These esters also had good heat (190° C.) stability and were resistant to hydrolysis. Analysis indicated that the lactose was completely esterified.

(2) *Preparation of lactose propionate isobutyrate.*—Example 1 was repeated except that the acetic anhydride was replaced with 260 g. (2 moles) of propionic anhydride. This gave 815 g. of an ester with physical properties very similar to those described in Example 1.

(3) *Preparation of lactose acetate-propionate.*—One mole (342 g.) of lactose and 0.69 mole (27.6 g.) of sodium hydroxide were slurried in a mixture of 8 moles (1040 g.) of propionic anhydride and 2 moles (204 g.) of acetic anhydride. The reaction was carried out and the product processed as described in Example 1 to give a hard amorphous solid which was heat stable and hydrolysis resistant.

(4) A film of cellulose acetate containing 25% of the lactose acetate isobutyrate of Example 1 was cast from a solvent. On removing the solvent a clear, hard, flexible film was obtained. The lactose acetate isobutyrate did not exude from the film or form an opaque crystalline structure within the film on storage.

(5) A film of cellulose acetate butyrate containing

50% of the lactose acetate isobutyrate of Example 1 was cast as described in Example 4. A clear, hard film was obtained which had a Sward hardness rating of 84 as compared to 64 for an unmodified control film of the cellulose acetate butyrate. The film remained clear on storage.

We claim:
1. Lactose acetate isobutyrate.
2. Lactose propionate isobutyrate.
3. Lactose acetate propionate.

References Cited in the file of this patent

UNITED STATES PATENTS

| | | |
|---|---|---|
| 1,938,044 | Schmidt et al. | Dec. 5, 1933 |
| 1,959,590 | Lorand | May 22, 1934 |
| 2,013,034 | Cox | Sept. 3, 1935 |
| 2,253,064 | Dickey et al. | Aug. 19, 1941 |
| 2,378,447 | Soday | June 19, 1945 |
| 2,700,022 | Clayton et al. | Jan. 18, 1955 |
| 2,828,303 | Malm | Mar. 25, 1958 |
| 2,828,304 | Malm | Mar. 25, 1958 |

FOREIGN PATENTS

| | | |
|---|---|---|
| 552,161 | Great Britain | Nov. 25, 1943 |

OTHER REFERENCES

Schwartz et al.: J.A.C.S., vol. 73, 1951, page 4490.